US012627365B2

(12) United States Patent
Visoz et al.

(10) Patent No.: US 12,627,365 B2
(45) **Date of Patent: *May 12, 2026**

(54) METHOD FOR PROCESSING RADIO-FREQUENCY SIGNALS RECEIVED ON R ANTENNAS, AND CORRESPONDING RECEPTION METHOD, DECODING METHOD, COMPUTER PROGRAM AND SYSTEM

(71) Applicant: Orange, Issy-les-Moulineaux (FR)

(72) Inventors: Raphaël Visoz, Chatillon (FR); Atoosa Hatefi, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/566,992

(22) PCT Filed: Jun. 3, 2022

(86) PCT No.: PCT/FR2022/051058
§ 371 (c)(1),
(2) Date: Dec. 4, 2023

(87) PCT Pub. No.: WO2022/254160
PCT Pub. Date: Dec. 8, 2022

(65) Prior Publication Data
US 2024/0267111 A1      Aug. 8, 2024

(30) Foreign Application Priority Data
Jun. 4, 2021    (FR) ...................................... 2105929

(51) Int. Cl.
*H04B 7/08*        (2006.01)
*H04L 25/02*       (2006.01)
(52) U.S. Cl.
CPC ........... *H04B 7/086* (2013.01); *H04L 25/021* (2013.01)

(58) Field of Classification Search
CPC .... H04B 7/086; H04B 7/0452; H04B 7/0837; H04L 25/021; H04L 25/0224; H04L 25/03891; H04W 88/085
See application file for complete search history.

(56) References Cited

U.S. PATENT DOCUMENTS

| | | |
|---|---|---|
| 2016/0315674 A1 | 10/2016 | Li et al. |
| 2020/0204248 A1 | 6/2020 | Lu et al. |

(Continued)

FOREIGN PATENT DOCUMENTS

WO      WO 2020/130895 A1      6/2020

OTHER PUBLICATIONS

International Search Report for International Application No. PCT/FR2022/051058 dated Sep. 9, 2022.

(Continued)

*Primary Examiner* — Vineeta S Panwalkar
(74) *Attorney, Agent, or Firm* — Knobbe, Martens, Olson & Bear, LLP

(57)        ABSTRACT

A method of processing radio-frequency signals received on R antennas, and corresponding reception method, decoding method, computer program and system. The method for processing radio-frequency signals received on R antennas, where R≥2, includes, implemented by a radio unit: obtaining a frequency representation of the radio-frequency signal received on an antenna, demapping the frequency representations, estimating the transmission channel of the radio-frequency signals and a noise-plus-interference covariance, projecting a vector of R associated complex samples onto a vector of L complex samples, referred to as projected samples, transmitting at least one item of control information and the vector of L projected samples to a base band processing unit, and the following, implemented by the base band processing unit: receiving the item of control informa- (Continued)

tion transmitted by the radio unit, receiving the vector of L projected samples transmitted by the radio unit, equalising the L projected samples, processing the equalised symbols.

12 Claims, 3 Drawing Sheets

(56)            References Cited

U.S. PATENT DOCUMENTS

2020/0280927 A1*   9/2020   Charipadi  ........... H04W 52/241
2024/0154660 A1*   5/2024   Lu  .......................... H04B 7/024

OTHER PUBLICATIONS

International Search Report for International Application No. PCT/FR2022/051059 dated Sep. 12, 2022.

* cited by examiner

METHOD FOR PROCESSING RADIO-FREQUENCY SIGNALS RECEIVED ON R ANTENNAS, AND CORRESPONDING RECEPTION METHOD, DECODING METHOD, COMPUTER PROGRAM AND SYSTEM

CROSS-REFERENCE TO RELATED APPLICATIONS

This application is filed under 35 U.S.C. § 371 as the U.S. National Phase of Application No. PCT/FR2022/051058 entitled "METHOD FOR PROCESSING RADIO-FRE-QUENCY SIGNALS RECEIVED ON R ANTENNAS, AND CORRESPONDING RECEPTION METHOD, DECODING METHOD, COMPUTER PROGRAM AND SYSTEM" and filed Jun. 3, 2022, and which claims priority to FR 2105929 filed Jun. 4, 2021, each of which is incorporated by reference in its entirety.

BACKGROUND

Field

The field of the development is that of telecommunications.

More specifically, the development relates to uplink communications, that is from the mobile terminals (or UE for "User Equipment") to a base station (or eNodeB, gNodeB, etc.).

In particular, the development proposes a new distribution of the functionalities implemented by a radio unit and by a base band processing unit, for decoding radio-frequency signals received on a plurality of antennas of a base station.

The proposed solution applies in particular, but not exclusively, in the context of 5G NR ("New Radio") mobile networks.

Description of the Related Art

Typically, a radio-frequency signal received on an antenna undergoes analogue processing, analogue-to-digital conversion and then digital processing.

Digital processing can be performed by a base band processing unit, also referred to as a Base Band Unit (BBU) or a Distributed Unit (DU).

The active part of the analogue processing can be performed by a Radio Unit (RU), also referred to as a Remote Radio Head (RRH). For this purpose, it is recalled that within the analogue processing part, a distinction can be made between a passive part, comprising in particular the antenna radiating elements, and an active part, comprising in particular the filters, amplifiers, analogue/digital converters, etc.

The evolution of base stations and of associated antenna structures has involved separating analogue and digital processing functionalities, bringing analogue processing as close as possible to the antenna, or even integrating it into the antenna panel.

Thus, the first generations of antennas implemented only one antenna. The base station BTS (Base Transceiver Station) was connected to the passive elements of the antenna by means of a coaxial cable, via a limited number of antenna ports (maximum 4). The disadvantage of this architecture is the loss of radio-frequency signal power between the antenna ports and the base station. It also limits the acceptable distance between the BTS and the passive antennas.

The centralised RAN (Radio Access Network) architecture, based on a geographical separation of the base band computing capacities (DU) for digital processing operations and the radio transmitters (RUs) for active analogue processing operations, was then developed. This type of architecture offers both functional benefits, thanks to better coordination between cells at centralised unit level, and cost benefits, through pooling the computing capacities of the various cells in common servers. For example, several RUs can communicate with one DU. The interface between the DU and the RU is referred to as a "FrontHaul", and can be used to move the RU up to a maximum distance of 20 km to centralise DUs.

As 3GPP specifications have introduced the concept of logical antenna port defined by a virtualisation (precoding/beam creation) of the logical antenna ports to the physical antenna ports, the physical antenna ports are now identified as Transceiver Units (TXRUs). In addition, TXRUs integrate the active analogue part by antenna port, thus defining an input port to the analogue domain.

The evolution of base stations has consisted in bringing the TXRUs as close as possible to the antenna, or integrated into the antenna in a radio unit RU. The base band processing unit DU is thus connected to the RU via an optical fibre carrying a digital signal, thereby limiting the propagation losses associated with the use of a coaxial cable.

In addition, the number of TXRUs has increased significantly over time, and can now reach the value of 64 for 5G (massive MIMO).

As illustrated in FIG. 1, several splits of functionalities between the RU and the DU have been proposed, with different requirements in terms of complexity of the RUs, intelligence of the DUs, or required bandwidth for transport.

The split of functionalities between the DU and the RU depends on the split option chosen. However, these splits do not provide a complete standardisation of interfaces that enable genuine interoperability between the various providers.

The xRAN Fronthaul working group, and more recently the O-RAN standardisation alliance, have taken charge of the complete specification of a single open and interoperable interface between different RU and DU providers ("Open Fronthaul").

To this end, they have defined the 7.2x split, that is an adaptation of the 7.2 split specified in the 3GPP and that reduces the complexity of the RU by moving processing functions up to the DU level. More specifically, the DU includes the RLC/MAC/PHY-high layers, and the RU includes the PHY-low layer. The PHY-low layer implemented in an RU comprises, in addition to the active analogue part of the antennas, some base band processing operations (close to the analogue part) such as FFT/IFFT or digital beamforming.

The resulting increase in bandwidth on the "open fronthaul" interface can be offset by compression mechanisms referenced by the O-RAN Alliance.

FIG. 2 illustrates more precisely the functionalities implemented by the RU 21 and by the DU 22, in the uplink direction, for split 7.2x.

The 7.2x split consists in transferring the channel estimation 221 and RE-demapping 222 functionalities (extraction and separation of the resource elements (REs) carrying the data and reference signals, in particular the DMRSs (De-Modulation Reference Signals)) to the ORAN Distributed Unit (O-DU) 22. In addition, the 7.2x split includes a functionality, implemented by the O-RU 21, referred to as port reduction 212, that reduces the number of streams to be transmitted to the O-DU. Thus, after processing 211 of the R radio-frequency signals received on the R reception branches, the number of streams to be transmitted to the O-DU is reduced by the port reduction 212. Without a technique for reducing the number of ports, the ORAN Radio Unit (O-RU) 21 would transmit a number of streams IQ equal to the number of reception branches R to the O-DU 22, whereas the number of spatial layers v to be detected is often much lower. To address this problem, the 7.2x split thus includes the port reduction functionality 212, that is a form of precoding. It is typically used to go from R=64 streams to v=8 streams for MU-MIMO uplink transmission with 8 spatial layers. It should be noted that these 8 streams can be distributed between a single PUSCH (SU-MIMO) or several PUSCHs (MU-MIMO) occupying the same time-frequency resource, each PUSCH i being transmitted from a different terminal (or UE) and being able to carry $v_i$ spatial layers where $v=\Sigma_i v_i$.

However, this precoding 212 (performed by the O-RU) cannot be based on the DMRS-based channel estimation 221 (performed by the O-DU), as this would require sending all the R streams to the O-DU 22 (DMRS signals being carried by each PUSCH channel), which is contradictory to the aim of reducing the number of ports. Thus, the port reduction must be based on other reference signals, for example the SRSs transmitted in the uplink direction with a relatively high periodicity (in the order of 40 ms). As part of the 7.2x split, the O-DU 22 estimates the channel based on SRS signals and sends it back to the O-RU ("channel information based beamforming" option in the O-RAN standard) or sends the port reduction precoding coefficients directly back to the O-RU ("weights based beamforming" option in the O-RAN standard).

One advantage of the 7.2x split is that the equalisation 223 and decoding 224 functionalities can be co-located in the DU 22, making it possible to implement advanced receivers with interference subtraction involving a decoding feedback loop.

One disadvantage of the 7.2x split is that the precoding coefficients for the port reduction 212 are less up to date than if this precoding were based on a DMRS channel estimation, because the DMRSs are part of the PUSCH transmission (they provide a snapshot of the channel and the interference). There is therefore a major problem for the 7.2x split in receiving the PUSCH(s) in the uplink direction.

There is therefore a need for a new split of functionalities between the RU and the DU which does not have all the disadvantages of the prior art.

SUMMARY

The development proposes a solution which does not have all the disadvantages of the prior art, in the form of a method for processing radio-frequency signals received on R antennas, where R≥2, implementing a radio unit communicating with a base band processing unit.

According to the development, such a method comprises the following steps, implemented by the radio unit:

for each of the antennas, obtaining a frequency representation of the radio-frequency signal received on the antenna, formed by a set of complex samples;

demapping the (R) frequency representations, identifying useful resource elements, carrying data, and reference resource elements, carrying at least one reference signal, a useful resource element carrying v data symbols, where v≥1 is the number of spatial layers used for transmitting the data, estimating the transmission channel of the radio-frequency signals and a noise-plus-interference covariance from said at least one reference signal, for at least one useful resource element, projecting a vector of R complex samples associated with the useful resource element, obtained respectively from each of the frequency representations, onto a vector of L complex samples, referred to as projected samples, taking account of said estimation of the channel and of said noise-plus-interference covariance, where R>L≥v, transmitting at least one item of control information, obtained from said channel estimation, to said base band processing unit, and transmitting the vector of L projected samples to said base band processing unit.

Such a method further comprises the following steps, implemented by the base band processing unit:

receiving said at least one item of control information transmitted by the radio unit, receiving the vector of L projected samples transmitted by the radio unit, equalising the L projected samples, taking account of said at least one item of control information, processing the equalised symbols.

The proposed solution is therefore based on a new distribution of functionalities between a radio unit (located as close as possible to the antenna structure of a base station) and a base band processing unit (located at bottom of the base station, or in a data centre close to the base station, for example within a radius of 20 km).

More specifically, the channel estimation is implemented by the radio unit. It can therefore be implemented from DMRS-based reference signals for a more accurate estimation of the transmission channel and improved projection quality. In particular, it offers an interesting solution for receiving the PUSCH channel(s) in the uplink direction.

As for equalisation and decoding, they are performed by the base band processing unit, enabling an advanced reception processing, in particular an iterative processing based on the subtraction of estimated interference.

In particular, the solution proposes a projection technique implemented by the radio unit, that reduces the quantity of signals intended for the base band processing unit. In particular, the projection is implemented on a vector of R complex samples obtained from the R frequency representations (one sample for each frequency representation). Thus, for a given useful resource element, corresponding for example to a subcarrier of an OFDM symbol, the sample corresponding to this useful resource element (i.e. to this subcarrier of an OFDM symbol) is identified in each of the R frequency representations.

A useful resource element carries one or more data symbols, a reference resource element carries one or more reference symbols. In the case of a reference resource element, to limit the interference between spatial layers, in general, a single reference symbol $x_i$ is non-zero among the v reference symbols, in order to estimate the channel associated with the layer i (i=1, . . . , v).

A reference signal identifies all the reference symbols that can be used for channel estimation.

For example, said at least one item of control information transmitted from the radio unit to the base band processing unit belongs to the group comprising:

a channel matrix H representative of the transmission channel, a covariance matrix $K_I$ representative of the noise-plus-interference covariance, a projection matrix G, a whitening projection matrix $$G_b = \left(GK_I G^\dagger\right)^{-\frac{1}{2}} G,$$

corresponding to the projection matrix G followed by a whitening, a product GH, a product $GK_IG^\dagger$.

The control information transmitted by the radio unit is used in particular by the base band processing unit to estimate the interference and the received signal.

In particular, at least one item of control information is transmitted for a set of resource elements. In this way, the amount of control information transmitted from the radio unit to the base band processing unit is limited if the channel is approximately constant over several resource elements (REs).

According to a first example, for a useful resource element, the vector y of R complex samples as input to the projection is expressed as:

$$y = Hx + n$$

where $y \in \mathbb{C}^R$ is a vector of size R, $H \in \mathbb{C}^{R \times v}$ is the channel matrix representative of the transmission channel of size R×v, $x \in \mathbb{C}^v$ is a vector of data symbols of size v, and n E $\mathbb{C}^R$ is a noise-plus-interference vector of size R, whose covariance matrix is $K_I = \mathbb{E}\{nn^\dagger\} \in \mathbb{C}^{R \times R}$ of size R×R. The covariance matrix $K_I$ therefore represents the noise-plus-interference before projection.

The vector $y_1$ of L projected samples as output from the projection is expressed as:

$$y_1 = Gy = GHx + Gn = GHx + n_1$$

where $y_1 \in \mathbb{C}^L$ is a vector of size L, $G \in \mathbb{C}^{L \times R}$ is the projection matrix of size L×R, $K_1 = \mathbb{E}\{n_1 n_1^\dagger\} = (GK_IG^\dagger)$. The matrix $K_1$ therefore represents the resulting noise-plus-interference after projection.

According to this first example, the transmission of at least one item of control information transmits, for example:

the channel matrix H, the projection matrix G, and the covariance matrix $K_I$, or the projection matrix G, the product GH and the covariance matrix $K_I$, or the product GH and $K_1 = (GK_IG^\dagger)$, so that the base processing unit reconstructs the model $y_1 = GHx + n_{11}$.

In particular, if L=v, the projection matrix G can be $$G = H^\dagger K_I^{-1} \in \mathbb{C}^{v \times R},$$

where the matrix $K_1$ is equal to $$K_1 = (H^\dagger K_I^{-1} H) \in \mathbb{C}^{v \times v}.$$

This projection has the particularity to be without loss of information on the useful signal (vector of data symbols) x.

In this case, the matrix $$K_I^{-\frac{1}{2}}$$

is first applied to the signal received y to whiten the noise, then a suitable filter is applied to obtain $$G = H^\dagger K_I^{-1}.$$

Globally, a suitable whitening filter is therefore applied. The noise resulting from the application of the projection G not being white, the projection may be followed by a whitening of the noise, as presented in the second example.

According to a second example, for a useful resource element, the vector y of R complex samples as input to the projection is expressed as:

$$y = Hx + n$$

where $y \in \mathbb{C}^R$ is a vector of size R, $H \in \mathbb{C}^{R \times v}$ is the channel matrix representative of the transmission channel of size R×v, $x \in \mathbb{C}^v$ is a vector of data symbols of size v, and $n \in \mathbb{C}^R$ is a noise-plus-interference vector of size R whose covariance matrix before projection is $K_I = \mathbb{E}\{nn^\dagger\} \in \mathbb{C}^{R \times R}$.

According to this second example, the projection being followed by a whitening, the vector $y_1$ of L projected samples as output from the projection is expressed as:

$$y_1 = (GK_IG^\dagger)^{-\frac{1}{2}} Gy = G_b y = G_b Hx + n_1$$

where $y_1 \in \mathbb{C}^L$ is a vector of size L, $$K_1 = \mathbb{E}\{n_1 n_1^\dagger\} = I_L,$$

where $I_L$ is an identity matrix of size L×L, representing the resulting noise-plus-interference after projection and whitening.

According to this second example, the transmission of at least one item of control information transmits the product GH so that the base processing unit reconstructs the model $y_1 = GHx + n_1$.

In particular, if L=v, the projection matrix G can be $$G = H^\dagger K_I^{-1} \in \mathbb{C}^{v \times R},$$

where the matrix $G_b$ is equal to $$(H^\dagger K_I^{-1} H)^{-\frac{1}{2}} H^\dagger K_I^{-1} \in \mathbb{C}^{v \times R}.$$

This projection has the particularity to be without loss of information on the useful signal x.

In this case, the matrix $$K_I^{-\frac{1}{2}}$$

is first applied to the signal received y to whiten the noise, then a suitable filter is applied to obtain $$G = H^\dagger K_I^{-1}.$$

Globally, a suitable whitening filter is therefore applied. The noise resulting from the application of the projection G not being white, the projection is followed by a whitening of the noise.

In particular, if L≥v, the projection matrix can be equal to $$G = V^\dagger K_I^{-\frac{1}{2}} \in \mathbb{C}^{L \times R},$$

where $V=[u_1, u_2 \ldots, u_L] \in \mathbb{C}^{R \times L}$ is a matrix carrying L vectors of dimension R corresponding to L directions of arrival at reception.

In particular, the method further comprises the transmission, from the radio unit to the base band processing unit, of a type of projection implemented.

For example, the radio unit transmits to the base band processing unit a flag indicating the type of control information transmitted, whether or not the projection is a projection followed by a whitening, etc.

In this way, the base band processing unit knows what type of projection is implemented.

As a variant, the base band processing unit can inform the radio unit of the functionalities implemented by the base band processing unit. For example, if the base band processing unit implements a DMRS-based channel estimation, it can inform the radio unit, that knows it is not necessary to transmit control information in this case.

The development also relates to a corresponding method for receiving radio-frequency signals on R antennas, R≥2 implemented by a radio unit, comprising:

for each of the antennas, obtaining a frequency representation of the radio-frequency signal received on the antenna, formed by a set of complex samples;

demapping the frequency representations, identifying useful resource elements, carrying data, and reference resource elements, carrying at least one reference signal, a useful resource element carrying v data symbols, where v≥1 is the number of spatial layers used for transmitting the data, estimating the transmission channel of the radio-frequency signals and a noise-plus-interference covariance from said at least one reference signal, for at least one useful resource element, projecting a vector of R complex samples associated with the useful resource element, obtained respectively from each of the R frequency representations, onto a vector of L complex samples, referred to as projected samples, taking account of said estimation of the channel and of said noise-plus-interference covariance, where R>L≥v, transmitting at least one item of control information, obtained from the channel estimation, to the base band processing unit, transmitting the vector of L projected samples to the base band processing unit.

Such a reception method could, of course, comprise the different characteristics relating to the processing method as implemented by the radio unit, which may be combined or taken separately. Thus, the characteristics and advantages of the reception method are the same as those of the processing method as implemented by the radio unit previously described.

In another embodiment, the development relates to the corresponding radio unit.

The development also relates to a corresponding method for decoding radio-frequency signals received on R antennas, R≥2, implemented by a base band processing unit, comprising:

receiving at least one item of control information transmitted by the radio unit, obtained from an estimation of the transmission channel of the radio-frequency signals implemented by the radio unit, receiving a vector of L complex samples, referred to as projected samples, transmitted by said radio unit, obtained by projecting a vector of R complex samples associated with a useful resource element, obtained respectively from each frequency representation of the radio-frequency signals, onto said vector of L projected samples, where R>L≥v, and v≥1 is the number of spatial layers used for transmitting the data, equalising the L projected samples, taking account of said at least one item of control information, processing (in particular decoding) the equalised symbols.

Such a decoding method could, of course, comprise the different characteristics relating to the processing method as implemented by the base band processing unit, which may be combined or taken separately. Thus, the characteristics and advantages of the decoding method are the same as those of the processing method as implemented by the base band processing unit previously described.

In another embodiment, the development relates to the corresponding base band processing unit.

The development also relates to one or more computer programs comprising instructions for implementing a processing, reception or decoding method as described above when this or these programs are executed by at least one processor.

Finally, the development relates to a system comprising at least one corresponding radio unit, configured to process radio-frequency signals received on R antennas, where R≥2, and at least one corresponding base band processing unit.

According to the development, the radio unit comprises:

means for obtaining a frequency representation of the radio-frequency signal received on each of said antennas, formed by a set of complex samples;

means for demapping the frequency representations, identifying useful resource elements, carrying data, and reference resource elements, carrying at least one reference signal, a useful resource element carrying v data symbols, where v≥1 is the number of spatial layers used for transmitting the data, means for estimating the transmission channel of the radio-frequency signals and a noise-plus-interference covariance from said at least one reference signal, means for projecting a vector of R complex samples associated with a useful resource element, obtained respectively from each of the frequency representations, onto a vector of L complex samples, referred to as projected samples, taking account of said estimation of the channel and of said noise-plus-interference covariance, where R>L≥v, means for transmitting at least one item of control information, obtained from said channel estimation, to said base band processing unit, means for transmitting the vector of L projected samples to said base band processing unit, and the base band processing unit comprises:

means for receiving said at least one item of control information transmitted by the radio unit, means for receiving said vector of L projected samples transmitted by the radio unit, means for equalising said L projected samples, taking account of said at least one item of control information, means for processing the equalised symbols.

BRIEF DESCRIPTION OF THE DRAWINGS

Other characteristics and advantages of the development will emerge more clearly upon reading the following description of a particular embodiment, provided as a simple illustrative non-restrictive example, and the annexed drawings, wherein.

DETAILED DESCRIPTION OF CERTAIN ILLUSTRATIVE EMBODIMENTS

General Principle

The general principle of the development is based on a new distribution of functionalities between the RU and the DU, according to which the RU implements a precoding/port reduction functionality based on an accurate channel estimation, and the DU implements the equalisation and decoding functionalities, enabling advanced reception processing.

As indicated in connection with the prior art, the RU, implementing the active part of the analogue processing, can be located as close as possible to the antenna structure. The DU, implementing the digital processing, can be located at the bottom of the antenna structure, or in a remote data centre, for example 15-20 km from the RU. In particular, a DU can serve several RUs ("pooling of resources").

One embodiment of the development is described below, in the context of a 5G network, in which one or more terminals can share the same time-frequency resources.

A time-frequency resource is a granularity in frequency (sub-band) and time (one or more OFDM symbols). A sub-band can range from a resource element (a subcarrier of an OFDM symbol), also referred to as Resource Element or RE in the 3GPP standards, to a resource block (12 REs), also referred to as Physical Resource Block or PRB, or even to several PRBs.

For example, it is considered that the base station receives various radio-frequency signals on R antennas, corresponding to the transmission, by at least one terminal or UE, of a PUSCH (Physical Uplink Shared Channel) physical channel. A PUSCH channel can comprise several spatial layers v.

During a slot having a duration of 0.5 ms for a sub-carrier spacing of 30 kHz in the "New Radio" standard, several PUSCH physical channels can be transmitted from various terminals. These can be multiplexed in frequency, time and space (MU-MIMO).

A physical channel is understood here as a physical layer channel from a specific user that provides the means for radio transmission of reference data/signals from the MAC layer (or transport channels).

In order to benefit from the (precoded) channel estimation based on a DMRS-based reference signal, by PUSCH transmitted during a slot NR, for port reduction at the radio unit RU, and to enable advanced interference processing at the base band unit DU, a new split is proposed, according to which the RE demapping and channel estimation functionalities are implemented by the RU, and the equalisation functionality is implemented by the DU.

Figures 1, 2:
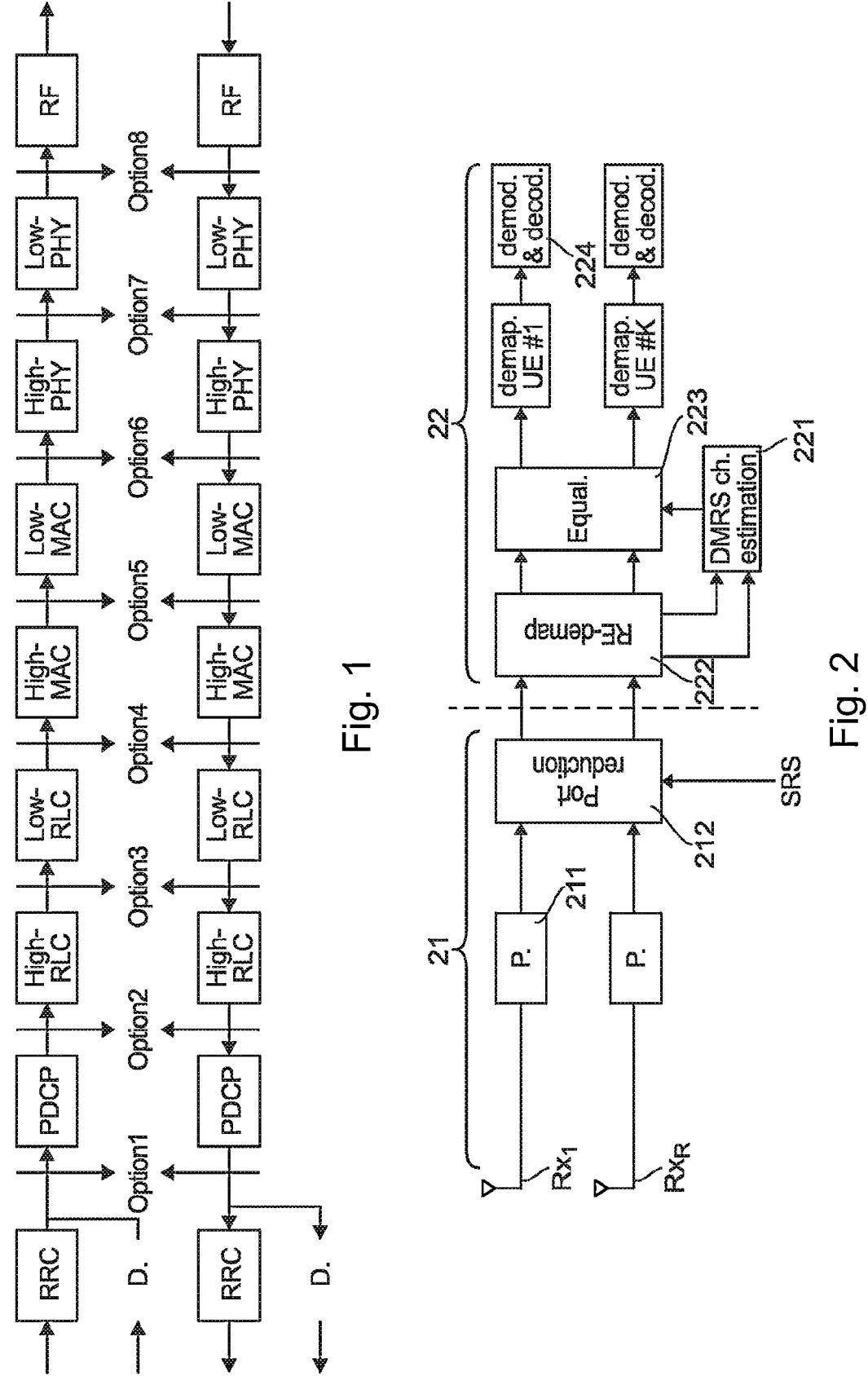
FIG. 1, introduced in the prior art section, illustrates various options for splitting functionalities between the radio and base band processing units, according to the 3GPP.
FIG. 2, introduced in the prior art section, illustrates the 7.2x option.
Figure 3:
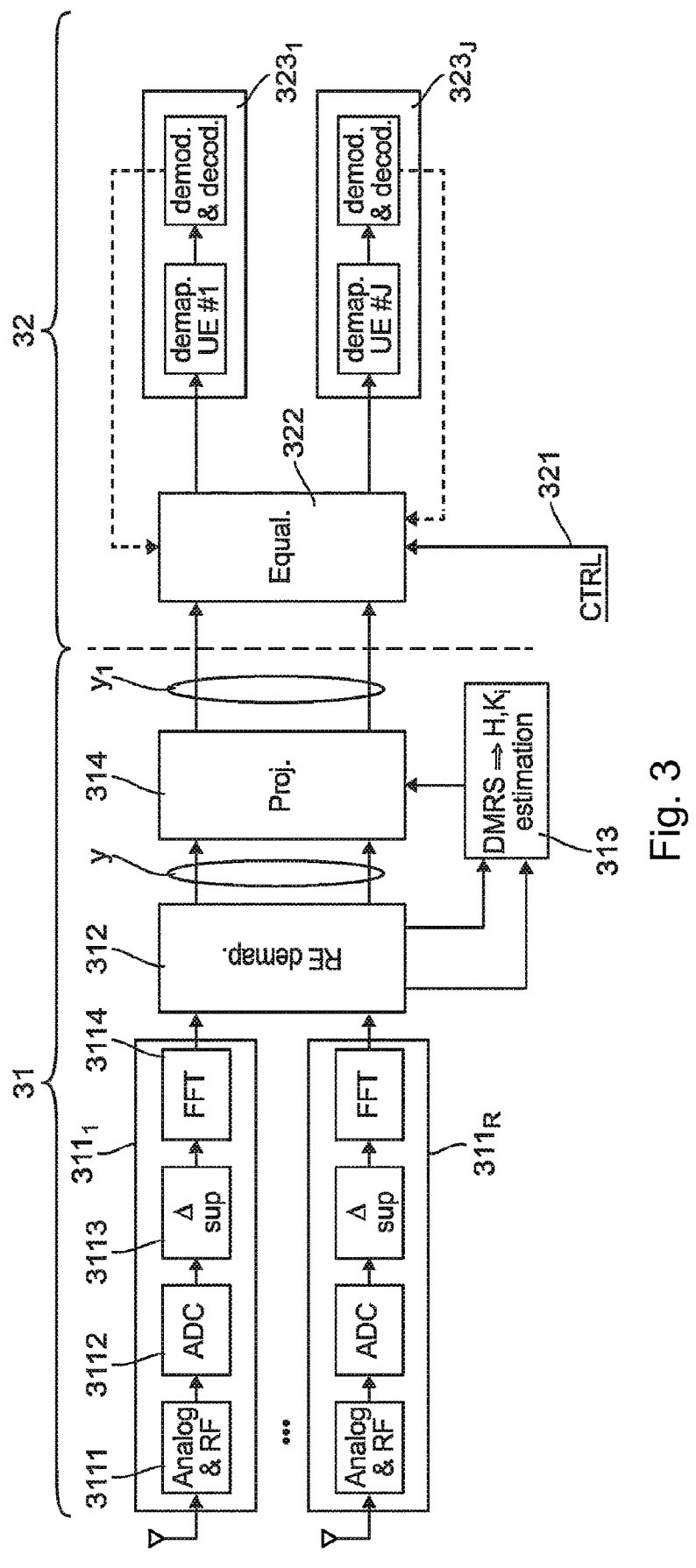
FIG. 3 shows the main steps implemented by a radio unit and a base band processing unit according to a particular embodiment of the development.

By way of illustration, FIG. 3 shows the main steps implemented by an RU 31 and by a DU 32 according to one embodiment, in the uplink direction.

A. Steps Implemented by the RU

For example, R antennas, or R reception branches, where R≥2, each receiving a different version of the same signal, corresponding to the combination of signals transmitted by at least one user terminal UE, for example a PUSCH, are considered. Each antenna r, where R≥r≥2, therefore receives a radio-frequency signal.

The RU 31 performs a processing operation 311r on the radio-frequency signal received on each antenna r, to obtain a frequency representation of the radio-frequency signal received on each antenna r. Each frequency representation is formed by a set of complex samples.

For example, the processing operation 3111 on the first antenna r=1 comprises:

receiving 3111 the radio-frequency signal ("analogue and RF" block). Receiving the radio-frequency signal is understood here as everything that corresponds to the active part of the analogue processing (filtering, amplification, frequency transposition), without the analogue-to-digital conversion, analogue-to-digital conversion 3112 of the received radio-frequency signal, deleting 3113 the guard interval if a guard interval was inserted before transmission, transforming 3114 the time domain to the frequency domain of the digital signal, delivering a frequency representation of the received radio-frequency signal.

The RU 31 also implements a demapping 312 of the R frequency representations, also known as RE-demapping. This demapping separates the resource elements carrying data, referred to as useful resource elements, from the resource elements carrying reference signals, referred to as reference resource elements. A useful resource element can carry v data symbols and a reference resource element can carry v reference symbols, including at least one non-zero reference symbol, where v≥1 is the number of spatial layers used for transmitting the data and the reference signals.

The RU 31 also implements an estimation 313 of the transmission channel of the radio-frequency signals and of the noise-plus-interference covariance impacting the radio-frequency signals, from said at least one reference signal extracted from the demapping 312, for example a DMRS.

The data carried by the useful resource elements can then be filtered by the RU to reduce the useful signal size, taking account of the estimation of the channel and of the noise-plus-interference covariance 313.

Thus, for at least one useful resource element (i.e. for a subcarrier of an OFDM symbol), the RU 31 performs a projection 314 of the R complex samples associated with this useful resource element (i.e. of the R complex samples obtained respectively from each of the R frequency representations corresponding to this subcarrier—one sample per frequency representation) onto L complex samples, referred to as projected samples, taking account of the estimation of the channel and of the noise-plus-interference covariance 313, where R>L≥v. More precisely, the same useful resource element k (associated with a particular OFDM symbol) for each reception branch, i.e. the same time-frequency position in the R received radio-frequency signals, is considered to construct a vector y of R complex samples.

The projection step 314, also referred to as precoding or port reduction, is described in more detail below.

Projection refers to a matrix $G_k \in \mathbb{C}^{L \times R}$ of size L×R applied to the received signal of dimension R (corresponding to R complex samples of the R frequency representations of the radio-frequency signals after RE-demapping.), for a useful resource element k, to obtain a projected signal of dimension L where v≤L<R.

In the remainder of the description, the index of the resource element k (or the frequency index per subcarrier and the OFDM symbol index) is omitted to simplify notations.

After demapping 312 the R frequency representations of the radio-frequency signals, the vector of R complex samples as input to the projection 314, corresponding to a useful or reference resource element (i.e. carrying data only), for a PUSCH with v spatial layers (N=1) or several PUSCHs i with $v_i$ spatial layers in the case of a MU-MIMO transmission, i=1, ..., N, carrying a given total of $v=\Sigma_i v_i$ space layers, can be written as:

$$y = [H_1 \ \ldots \ H_N] \begin{bmatrix} x_1 \\ \vdots \\ x_N \end{bmatrix} + n = Hx + n.$$

where:

$y \in \mathbb{C}^R$ is a vector of size R, $H_i \in \mathbb{C}^{R \times v_i}$ is a matrix of size R×$v_i$ representative of the (precoded) channel of the PUSCH i estimated during step 313, for example from its DMRSs, where i=1, ..., N $x_i \in \mathbb{C}^{v_i}$ is a vector of data symbols of size $v_i$ transmitted by the PUSCH i, each data symbol being associated with a spatial layer, where i=1, ..., N, and $n \in \mathbb{C}^R$ is a noise-plus-interference vector whose covariance matrix is $K_I = \mathbb{E}\{nn^\dagger\} \in \mathbb{C}^{R \times R}$.

The matrix $H \in \mathbb{C}^{R \times v}$ representative of the transmission channel associated with N PUSCH(s) transmitted on the same resource element can be written as $H = [H_1 \ldots H_N] \in \mathbb{C}^{R \times v}$, similarly the $v = \Sigma_i v_i$ spatial layers used to transmit the data symbols can be written as a vector $$x = \begin{bmatrix} x_1^T & \ldots & x_N^T \end{bmatrix}^T \in \mathbb{C}^v$$

of dimension v.

The estimation of the channel 313 from the DMRS reference signals, for example, is used to determine the channel $H \in \mathbb{C}^{R \times v}$ and covariance $K_I = \mathbb{E}\{nn^\dagger\} \in \mathbb{C}^{R \times R}$ matrices.

The covariance matrix $K_I$ represents the noise-plus-interference before projection.

The projection matrix G reduces the size of the vector of the received complex samples y while trying to keep sufficient statistics (without loss of information) on the transmitted symbols x for reception. The suitable filter is known to provide sufficient statistics in the presence of white noise by projecting the received signal and the noise onto the subspace of the useful signal.

A.1 Projection

According to a first example, the projection 314 is not followed by a noise whitening.

In this case, the projection matrix $G \in \mathbb{C}^{L \times R}$ is applied to the vector y, by the RU 31, to reduce the model to one dimension L, and to obtain, as output from the projection 314, a vector of complex samples, referred to as projected samples $y_1 \in \mathbb{C}^L$:

$$y_1 = Gy = GHx + n_1,$$

where $$K_1 = \mathbb{E}\{n_1 n_1^\dagger\} = (GK_I G^\dagger).$$

The matrix $K_1$ therefore represents the resulting noise-plus-interference after projection.

In the particular case where L=v, the projection matrix G can be $$G = H^\dagger K_I^{-1} \in \mathbb{C}^{v \times R};$$

this projection has the particularity to be without loss of information on the useful signal x.

In another example, not claimed, the projection matrix G can be $G = H^\dagger \in \mathbb{C}^{v \times R}$, which is a good approximation of the suitable whitening filter without the complexity of covariance $K_I$ inversion when the matrix $K_I$ approaches a multiple matrix of the identity.

The vector $y_1$ of L projected samples can thus be transmitted to the DU 32 for the user data, via the DU/RU interface ("fronthaul"), for example by an optical fibre.

Control information for this user data can also be transmitted to the DU 32, for example by optical fibre, so that the DU 32 can reconstruct the interference and the received signal.

Thus, to enable advanced reception at the DU 32, the RU 31 can transmit to the DU 32 via the "fronthaul", by resource element k or for a set of resource elements during which the (precoded) channel is approximately constant, and by PUSCH:

1) either the channel matrix $H_k$, the associated projection matrix $G_k$ and the noise-plus-interference covariance broadband matrix $K_I$ (which can be averaged over all OFDM subcarriers and symbols in the PUSCH resource allocation), 2) or the projection matrix $G_k$, the product $G_k H_k$ and the covariance matrix $K_I$, 3) or the product $G_k H_k$ and the product $$G_k K_I G_k^\dagger.$$

13

A.2. Projection Followed by a Noise Whitening

According to a second example, the projection 314 can be followed by a noise whitening.

In this case, the projection $G \in \mathbb{C}^{L \times R}$ applied to the vector y by the RU 31 is followed by a whitening $$\left(GK_I G^\dagger\right)^{-\frac{1}{2}}$$

to reduce the model to one dimension L without noise. As output from the projection 314, a vector of complex samples, referred to as projected samples, is obtained $y_1 \in \mathbb{C}^L$:

$$y_1 = \left(GK_I G^\dagger\right)^{-\frac{1}{2}} Gy = G_b y = G_b Hx + n_1$$

where $$K_1 = \mathbb{E}\left\{n_1 n_1^\dagger\right\} = I_L$$

where $I_L$ is an identity matrix of dimension L×L.

In the particular case where L=v, the projection matrix G can be $$G = H^\dagger K_I^{-1} \in \mathbb{C}^{v \times R},$$

followed by a whitening, such as $$G_b = \left(H^\dagger K_I^{-1} H\right)^{-\frac{1}{2}} H^\dagger K_I^{-1} \in \mathbb{C}^{v \times R};$$

this projection has the particularity to be without loss of information on the useful signal x.

In another example, not claimed, the projection matrix G can be $G=H^\dagger \in \mathbb{C}^{v \times R}$, followed by a whitening, such as $$G_b = \left(H^\dagger K_I H\right)^{-\frac{1}{2}} H^\dagger \in \mathbb{C}^{v \times R},$$

which is a good approximation of the suitable whitening filter without the complexity of covariance $K_I$ inversion when the matrix $K_I$ approaches a multiple matrix of the identity (no or limited spatial correlation of noise-plus-interference).

In the particular case where L≥v, the projection matrix G can be defined as proposed below.

To do so, it is assumed that the array of reception antennas, of dimension R, is linear and that the antennas are uniformly spaced (for example, by half a wavelength).

Classically, a direction of arrival/departure of the signal can be associated with a DFT vector of dimension R (where each coefficient of the DFT corresponds to a multiplicative factor to be applied to a different reception antenna to form a reception beam in a given direction). All of the orthonormal DFT vectors form an orthonormal basis of the received signal, commonly used to analyse the arrival directions of the received signal.

The L vectors of dimension R that form the columns of the matrix $V=[u_1, u_2 \ldots, u_L]$ of dimension R×L are considered. These L orthonormal vectors correspond to the L best reception directions (taken from the R orthonormal DFT vectors forming a basis of the received signal) with respect to the whitened channel $$H_w = K_I^{-\frac{1}{2}} H P^{\frac{1}{2}},$$

where $K_I$ is the noise-plus-interference covariance matrix, P is the data symbol vector covariance x ($P=\mathbb{E}\{xx^\dagger\}$) and H is the channel estimated from the DMRSs at the RU. One direction (DFT vector) $u_1$ is better than another direction $u_2$ if and only if $$u_1^\dagger H_w H_w^\dagger u_1 > u_2^\dagger H_w H_w^\dagger u_2.$$

It should be noted that $$H_w H_w^\dagger$$

can be estimated as $$\mathbb{E}\left\{y_w y_w^\dagger | H_w\right\} - I_R$$

where $$y_w = K_I^{-\frac{1}{2}} y$$

and $I_R$ is the identity matrix of dimension R. This allows to estimate $$H_w H_w^\dagger$$

using an estimator of the type $$\frac{1}{N} \sum_{k=1}^N y_{w,k} y_{w,k}^\dagger - I_R$$

with N received (whitened) samples.

According to this example, the projection then consists in the succession of the following two steps:

1) noise-plus-interference whitening by multiplying $$K_I^{-\frac{1}{2}}$$

on the received signal y of dimension R, 2) projecting the signal received after whitening $$\left(K_I^{-\frac{1}{2}} y\right)$$

of dimension R onto the L directions selected by multiplying $V^\dagger$.

In the particular case where $L \geq v$, the projection matrix G can therefore be $$V^\dagger K_I^{-\frac{1}{2}},$$

of dimension L×R.

The vector $y_1$ of L projected samples can thus be transmitted to the DU 32 for the user data, via the DU/RU interface ("fronthaul"), for example by an optical fibre.

Control information for this user data can also be transmitted to the DU 32, for example by optical fibre, so that the DU 32 can reconstruct the received signal.

In this case, to enable advanced reception at the DU 32, the RU 31 can transmit to the DU 32 via the "fronthaul", by resource element k or for a set of resource elements during which the (precoded) channel is approximately constant, and by PUSCH, the product $G_b H \in \mathbb{C}^{L \times v}$, where $$G_b = \left(GK_I G^\dagger\right)^{-\frac{1}{2}} G. \text{ If } L = v,$$

the RU 32 therefore transmits $v^2$ coefficients for control, namely 64 coefficients for 8 spatial layers.

According to these two examples (projection followed by a noise whitening or not), the control information is deduced from the reception of the reference signals that may be DMRS, which differs from the 7.2x option presented in the prior art.

At least one item of control information is transmitted to the base band processing unit 32, for example in an optical fibre. The L projected samples are also transmitted to the base band processing unit 32, for example in an optical fibre.

B. Steps Implemented by the DU

The DU 32 can thus receive the L projected samples transmitted by the radio unit 31 for a resource element k, as well as control information 321, as presented in the two examples above, for each PUSCH channel.

As previously indicated, control information such as channel matrix H, projection matrix G, product GH, can be moved up 321 from the RU to the DU for the resource element k or for a set of resource elements during which the (precoded) channel is approximately constant.

In the same way, to minimise the control load on the "fronthaul" interface, it is also possible to move up a covariance matrix K, from the RU to the DU for an OFDM symbol, or for a set of X OFDM symbols (for example 14 OFDM symbols, namely a duration of 0.5 ms for a subcarrier spacing of 30 kHz). This assumes that the noise-plus-interference covariance is the same over the entire band for a duration of X OFDM symbols.

The DU 32 can then implement an equalisation 322 of the L projected samples, taking account of the control information 321. The control information 321 is used in particular to reconstruct the interference and received signal models, so that equalisation can be implemented.

Finally, the DU 32 implements a processing operation 323j of the equalised symbols, for each user j, $1 \leq j \leq J$.

It is recalled that the purpose of the equalisation is to deal with interference between spatial layers in order to estimate/detect the symbols transmitted.

Thus, if a model after projection of the following type is considered:

$$y = Hx + n$$

where $y \in \mathbb{C}^L (v \leq L < R)$, $H \in \mathbb{C}^{L \times v}$ and $K_n = \mathbb{E}\{nn^\dagger\}$ the equaliser is, for example, an LMMSE-IRC equaliser according to the 3GPP, i.e. a filter $f_i \in \mathbb{C}^{1 \times L}$ (i=1, ..., v) such that the estimated $\hat{x}_i = f_i y$ minimises $\|f_i y - x_i\|^2$, where $\|X\|^2 = \mathbb{E}\{|X|^2\}$ is the variance of the random variable X. $f_i$ is then proportional to the ith row of the matrix $H^\dagger (HH^\dagger + K_n)^{-1}$.

According to the first example described above, the DU receives the vector $y_1$ and the control information comprising, for example, the product GH and the product $GK_I G^\dagger = K_1$.

As $$y_1 = Gy = GHx + n_1 \text{ and } K_1 = \mathbb{E}\{n_1 n_1^\dagger\} = \left(GK_I G^\dagger\right),$$

it is possible to reconstruct the vector $x \in \mathbb{C}^v$ of data symbols.

According to the second example described above, the DU receives the vector $y_1$ and the control information comprising, for example, the product $G_b H$.

As $y_1 = G_b y = G_b Hx + n_1$, it is possible to reconstruct the vector $x \in \mathbb{C}^v$ of data symbols.

Various techniques can notably be implemented to inform the DU 32 of the type of projection implemented by the RU 31.

For example, the DU knows that the projection implemented by the RU is followed (or not) by a whitening by configuration, or because it receives a message from the RU informing the DU that a whitening is implemented (or not), etc. Possibly, the DU may choose an option ("simple" projection or projection with whitening), and inform the RU of the option chosen.

The equalised symbol processing is a classic processing operation.

For example, the equalised symbol processing for the first user j=1 comprises:
  demapping the various spatial layers for the first user, delivering data symbols,
  demodulating and decoding the data symbols.

In particular, in the context of an advanced receiver, a feedback loop with equalisation 322 can be provided. For multiple user detection/equalisation (MU-MIMO), the equalisation can be performed jointly or separately by PUSCH. A feedback loop between the decoding of all users and the equalisation of users is possible in the context of an advanced receiver.

5.2 Simplified Structure of a Radio Unit and a Base Band Processing Unit

Figure 4:
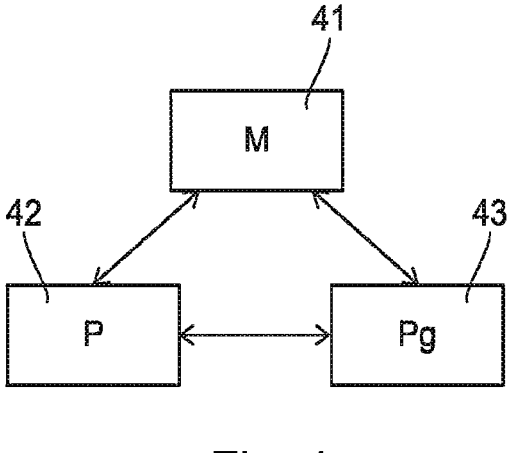
FIG. 4 shows the simplified structure of a radio unit according to a particular embodiment.

In relation to FIG. 4, the simplified structure of a radio unit according to at least one embodiment described above is now presented.

As illustrated in FIG. 4, such a radio unit comprises at least one memory 41 comprising a buffer memory, at least one processing unit 42, equipped for example with a programmable computing machine or a dedicated computing machine, for example a processor P, and controlled by the computer program 43, implementing steps of the reception method according to at least one embodiment of the development.

At initialisation, the code instructions of the computer program 43 are for example loaded into a RAM memory before being executed by the processor of the processing unit 42.

The processor of the processing unit 42 implements steps of the reception method previously described, according to the instructions of the computer program 43, to:

> obtain a frequency representation of the radio-frequency signal received on each of the R antennas, each frequency representation being formed by a set of complex samples;
>
> demap the frequency representations to identify the useful resource elements, carrying data, and the reference resource elements, carrying at least one reference signal,
>
> a useful resource element carrying v data symbols, where v≥1 is the number of spatial layers used for transmitting the data,
>
> estimate the transmission channel of the radio-frequency signals and the noise-plus-interference covariance from the reference signal(s),
>
> project a vector of R complex samples associated with a useful resource element, obtained respectively from each of the frequency representations, onto a vector of L complex samples, referred to as projected samples, taking account of the estimation of the channel and of the noise-plus-interference covariance, where R>L≥v,
>
> transmit at least one item of control information, obtained from the channel estimation, to the base band processing unit;
>
> transmit the vector of L projected samples to the base band processing unit.

Figure 5:
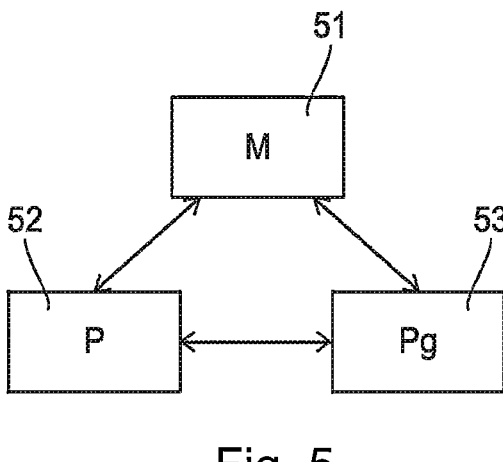
FIG. 5 shows the simplified structure of a base band processing unit according to a particular embodiment.

In relation to FIG. 5, the simplified structure of a base band processing unit according to at least one embodiment described above is finally presented.

As illustrated in FIG. 5, such a base band processing unit comprises at least one memory 51 comprising a buffer memory, at least one processing unit 52, equipped for example with a programmable computing machine or a dedicated computing machine, for example a processor P, and controlled by the computer program 53, implementing steps of the decoding method according to at least one embodiment of the development.

At initialisation, the code instructions of the computer program 53 are for example loaded into a RAM memory before being executed by the processor of the processing unit 52.

The processor of the processing unit 52 implements steps of the decoding method previously described, according to the instructions of the computer program 53, to:

> receive at least one item of control information transmitted by the radio unit,
>
> receive the vector of L projected samples transmitted by the radio unit,
>
> equalise the L projected samples, taking account of the (item of) control information,
>
> process (in particular decode) the equalised symbols.

The invention claimed is:

1. A method of processing radio-frequency signals received on R antennas, where R≥2, implementing a radio unit communicating with a base band processing unit, wherein the method comprises, implemented by the radio unit:

> for each of the antennas, obtaining a frequency representation of the radio-frequency signal received on the antenna, formed by a set of complex samples;

> demapping the frequency representations, identifying useful resource elements, carrying data, and reference resource elements, carrying at least one reference signal,
>
> a useful resource element carrying v data symbols, where v≥1 is the number of spatial layers used for transmitting the data,
>
> performing an estimation of a transmission channel of the radio-frequency signals and a noise-plus-interference covariance from the at least one reference signal of a DeModulation Reference Signal (DMRS) type,
>
> for at least one useful resource element, projecting a vector of R complex samples associated with the at least one useful resource element, obtained respectively from each of the frequency representations, onto a vector of L complex samples, taking account of the estimation of the transmission channel and of the noise-plus-interference covariance, where R>L≥v,
>
> transmitting at least one item of control information, obtained from the estimation of the transmission channel, to the base band processing unit,
>
> transmitting the vector of L complex samples to the base band processing unit, and wherein the method comprises, implemented by the base band processing unit:
>
> receiving the at least one item of control information transmitted by the radio unit,
>
> receiving the vector of L complex samples transmitted by the radio unit,
>
> equalising the L complex samples, taking account of the at least one item of control information,
>
> processing equalised data symbols.

2. The method according to claim 1, wherein the at least one item of control information belongs to a group comprising:

> a channel matrix H representative of the transmission channel,
>
> a covariance matrix $K_I$ representative of the noise-plus-interference covariance,
>
> a projection matrix G,
>
> a whitening projection matrix $$G_b = (GK_I G^\dagger)^{-\frac{1}{2}} G,$$

> a product GH, and
>
> a product $GK_I G^\dagger$.

3. The method according to claim 1, wherein the transmitting of at least one item of control information is implemented for a set of resource elements.

4. The method according to claim 2, wherein, for the at least one useful resource element, the vector of R complex samples as input to projecting is expressed as:

$$y = Hx + n$$

where $y \in \mathbb{C}^R$, $H \in \mathbb{C}^{R \times v}$ is the channel matrix representative of the transmission channel, $x \in \mathbb{C}^v$ is a vector of data symbols, and $n \in \mathbb{C}^R$ is a noise-plus-interference vector whose covariance matrix is $K_I = \mathbb{E}\{nn^\dagger\} \in \mathbb{C}^{R \times R}$, wherein the vector of L complex samples as output from the projection is expressed as:

$$y_1 = Gy = GHx + Gn = GHx + n_1$$

$$\text{where } y_1 \in \mathbb{C}^L, \ G \in \mathbb{C}^{L \times R}, \ K_1 = E\{n_1 n_1^\dagger\} = (GK_I G^\dagger)$$

and wherein the transmitting of at least one item of control information transmits:

the channel matrix H, the projection matrix G, and the covariance matrix $K_I$, or the projection matrix G, the product GH and the covariance matrix $K_I$, or the product GH and $K_1 = (GK_I G^\dagger)$.

5. The method according to claim 1, wherein, for the at least one useful resource element, the vector of R complex samples as input to the projection is expressed as:

$$y = Hx + n$$

where $y \in \mathbb{C}^R$, $H \in \mathbb{C}^{R \times v}$ is a channel matrix representative of the transmission channel, $x \in \mathbb{C}^v$ is a vector of data symbols, and $n \in \mathbb{C}^R$ is a noise-plus-interference vector whose covariance matrix is $K_I = \mathbb{E}\{nn^\dagger\} \in \mathbb{C}^{R \times R}$, wherein the vector of L complex samples as output from the projection is expressed as:

$$y_1 = (GK_I G^\dagger)^{-\frac{1}{2}} Gy = G_b y = G_b Hx + n_1$$

$$\text{where } y_1 \in \mathbb{C}^L, \ K_1 = \mathbb{E}\{n_1 n_1^\dagger\} = I_L,$$

where G is a projection matrix, and wherein the transmitting of at least one item of control information transmits the product $G_b H$.

6. The method according to claim 4, wherein for L=v, the projection matrix is equal to $$G = H^\dagger K_I^{-1} \in \mathbb{C}^{v \times R}.$$

7. The method according to claim 5, wherein for L≥v, the projection matrix is equal to $$G = V^\dagger K_I^{-\frac{1}{2}} \in \mathbb{C}^{L \times R},$$

where $V = [u_1, u_2 \ldots, u_L] \in \mathbb{C}^{R \times L}$ is a matrix carrying L vectors of dimension R corresponding to L directions of arrival at reception.

8. The method according to claim 1, wherein the method further comprises transmitting, from the radio unit to the base band processing unit, a type of projection implemented.

9. A method of receiving radio-frequency signals on R antennas, where R≥2, implementing a radio unit communicating with a base band processing unit, wherein the method comprises, implemented by the radio unit:

for each of the antennas, obtaining a frequency representation of the radio-frequency signal received on the antenna, formed by a set of complex samples;

demapping the frequency representations, identifying useful resource elements, carrying data, and reference resource elements, carrying at least one reference signal of a DeModulation Reference Signal (DMRS) type, a useful resource element carrying v data symbols, where v≥1 is the number of spatial layers used for transmitting the data, performing an estimation of a transmission channel of the radio-frequency signals and a noise-plus-interference covariance from the at least one reference signal, for at least one useful resource element, projecting a vector of R complex samples associated with the at least one useful resource element, obtained respectively from each of the frequency representations, onto a vector of L projected samples, taking account of the estimation of the transmission channel and of the noise-plus-interference covariance, where R>L≥V, transmitting at least one item of control information, obtained from the estimation of the transmission channel, to the base band processing unit, and transmitting the vector of L projected samples to the base band processing unit.

10. A method of decoding radio-frequency signals received on R antennas, where R≥2, implementing a radio unit communicating with a base band processing unit, wherein the method comprises, implemented by the base band processing unit:

receiving at least one item of control information transmitted by the radio unit, obtained from an estimation of a transmission channel of the radio-frequency signals implemented by the radio unit, from at least one reference signal of a DeModulation Reference Signal (DMRS) type, receiving a vector of L complex samples, transmitted by the radio unit, obtained by projecting a vector of R complex samples associated with a useful resource element carrying v data symbols, the R complex samples being obtained from a frequency representation of the radio-frequency signal received on each antenna, onto the vector of L complex samples, where R>L≥v, and v≥1 is the number of spatial layers used for transmitting the data, equalising the L complex samples, taking account of the at least one item of control information, and processing equalised data symbols.

11. A processing circuit comprising a processor and a memory, the memory storing program code instructions of a computer program for implementing the method according to claim 1 when the computer program is executed by the processor.

12. A system comprising at least one radio unit, configured to process radio-frequency signals received on R antennas, where R≥2, and at least one base band processing unit, wherein the radio unit comprises at least a first processor configured to:

obtain a frequency representation of the radio-frequency signal received on each of the antennas, each frequency representation being formed by a set of complex samples;

demap the frequency representations, identifying useful resource elements, carrying data, and reference resource elements, carrying at least one reference signal of a DeModulation Reference Signal (DMRS) type, at least one useful resource element carrying v data symbols, where v≥1 is the number of spatial layers used for transmitting the data, estimate a transmission channel of the radio-frequency signals and a noise-plus-interference covariance from the at least one reference signal, project a vector of R complex samples associated with the at least one useful resource element, obtained respectively from each of the frequency representations, onto a vector of L complex samples, taking account of the estimate of the transmission channel and of the noise-plus-interference covariance, where $R > L \geq v$, transmit at least one item of control information, obtained from the estimate of the transmission channel, to the base band processing unit, transmit the vector of L complex samples to the base band processing unit, and wherein the base band processing unit comprises at least a second processor configured to:

receive the at least one item of control information transmitted by the radio unit, receive the vector of L complex samples transmitted by the radio unit, equalise the L complex samples, taking account of the at least one item of control information, process equalised data symbols.

\* \* \* \* \*